(12) United States Patent
Nichols (10) Patent No.: US 6,433,866 B1
(45) Date of Patent: Aug. 13, 2002

(54) HIGH PRECISION GPS/RTK AND LASER MACHINE CONTROL

(75) Inventor: Mark Edward Nichols, Sunnyvale, CA (US)

(73) Assignee: Trimble Navigation, LTD, Sunnyvale, CA (US)

( * ) Notice: Subject to any disclaimer, the term of this patent is extended or adjusted under 35 U.S.C. 154(b) by 0 days.

(21) Appl. No.: 09/566,041

(22) Filed: May 6, 2000

Related U.S. Application Data (63) Continuation-in-part of application No. 09/083,412, filed on May 22, 1998, now abandoned.

(51) Int. Cl.[7] .......................... G01B 11/26; H04B 7/185; H01S 3/30
(52) U.S. Cl. .............. 356/141.1; 342/357.08; 342/357.14; 342/357.18; 372/4.5
(58) Field of Search .................. 356/4.08, 141.3–141.5, 356/141.1; 342/357.08, 357.14, 357.17; 372/4.5

(56) References Cited

U.S. PATENT DOCUMENTS

| | | | | |
|---|---|---|---|---|
| 4,818,107 A | * | 4/1989 | Ono et al. .................. 356/375 |
| 4,820,041 A | * | 4/1989 | Davidson et al. | |
| 5,294,970 A | * | 3/1994 | Dornbusch et al. | |
| 5,600,436 A | * | 2/1997 | Gudat ..................... 356/141.3 |
| 5,612,864 A | * | 3/1997 | Henderson ................. 356/3.01 |
| 5,644,386 A | * | 7/1997 | Jenkins et al. ............. 356/4.01 |
| 5,760,909 A | * | 6/1998 | Nichols .................... 356/4.08 |
| 5,784,755 A | | 7/1998 | Ohtomo et al. | |

* cited by examiner

*Primary Examiner*—Stephen C. Buczinski
(74) *Attorney, Agent, or Firm*—Boris G. Tankhilevich (57) ABSTRACT

The integrated laser and satellite positional system receiver is disclosed. The integrated laser and satellite positioning system receiver can provide a plurality of mobile units with a laser plane data determined with a millimeter relative accuracy. The integrated laser and differential satellite positioning system receiver can also generate and transmit the differential correctional data to a plurality of mobile units. Each mobile unit equipped with a mobile satellite positioning system receiver can use the differential correction data and the high precision laser plane data to improve its position determination capabilities.

11 Claims, 6 Drawing Sheets

HIGH PRECISION GPS/RTK AND LASER MACHINE CONTROL

This is a continuation-in-part of the U.S. patent application Ser. No. 09/083,412, entitled "GPS/RTK AND LASER MACHINE CONTROL" and filed on May 22, 1998 now abandoned.

FIELD OF THE INVENTION

The present invention relates generally to the field of machine control systems, and more specifically, to the field of laser machine control systems.

DESCRIPTION OF THE BACKGROUND ART

In one prior art related to machine control systems, different satellite navigational systems, like GPS, GLONASS, and GPS/GLONASS are used to determine position coordinates and to control a mobile unit. An autonomous navigational system that includes the satellite receiver and a navigational computer can achieve the 10-meter level of accuracy in the position determination of a mobile unit. The differential navigational systems that utilize differential corrections in addition to the satellite signals can determine the positional information with the meter-range accuracy. The real-time kinematic (RTK) GPS systems that are capable of utilizing in real time not only code but also carrier information transmitted from satellites can achieve the centimeter level of accuracy in the position determination of a mobile unit.

However, the millimeter level of accuracy is still beyond the reach of the satellite navigational systems. The existing rotating laser-based systems can define the plane level with the millimeter level of accuracy. However, this systems can not be used for the three dimensional navigational purposes because they can define only the level plane.

What is needed is a combinational guidance and tracking system including a laser system and high accuracy satellite navigational system that allows a user to realize a high precision control of mobile units, including a high precision machine control.

SUMMARY OF THE INVENTION

To address the shortcomings of the available art, the present invention discloses a combinational guidance and tracking system including a laser system and high accuracy satellite navigational system in a single package that allows a user to realize a high precision control of mobile units, including a high precision machine control.

One aspect of the present invention is directed to an integrated laser and satellite positioning guidance system (LASATPSAG). In one embodiment of the present invention, the LASATRAG comprises: (a) an integrated laser and satellite positioning system (LASATPS) positioned in a location with known coordinates; (b) a mobile unit including a laser detector and a mobile satellite positioning system (SATPS) receiver; and (c) a communication link between the LASATPS system and the mobile unit.

The LASATPS system further comprises: (a1) a laser system generating a laser beam providing a high accuracy vertical coordinate; and (a2) a stationary satellite positioning system (SATPS) receiver integrated with the laser system. The stationary SATPS receiver includes a stationary satellite antenna exposed to the view of sky. The distance between the phase center of the stationary satellite antenna and the laser beam is known and fixed. The communication link is used to continuously transmit to the mobile unit the vertical coordinate of the laser beam and differential corrections obtained by the stationary SATPS receiver. The mobile SATPS receiver utilizes the received differential corrections to obtain the precise coordinate measurements of the mobile unit.

Another aspect of the present invention is directed to an integrated laser and satellite positioning guidance system (LAVSATPSAG) comprising: (d) an integrated laser and vector satellite positioning system (LAVSATPS) positioned in a location with known coordinates, (e) at least one mobile unit, and (f) a plurality of communication links between the LAVSATPS system and each mobile unit.

In one embodiment, the LAVSATPS system further comprises: (d1) a laser system generating a rotating laser beam, and (d2) a vector differential satellite positioning system (VSATPS) receiver integrated with the laser system. The vector differential VSATPS receiver includes a master stationary satellite antenna and a plurality of slave stationary satellite antennas exposed to the view of sky. The distance between a phase center of the master stationary satellite antenna and the reference laser plane is known and fixed. The rotating laser beam provides a high accuracy dual slope reference laser plane, and the vector differential VSATPS receiver is capable of determining the attitude of the dual slope reference laser plane. Each mobile unit includes a laser detector and a navigational device including a mobile satellite positioning system (SATPS) receiver. At least one communication link is used to transmit to each mobile unit an elevation, a slope and angles of orientation of the laser plane at the location of the (LAVSATPS) and differential corrections obtained by the vector differential SATPS receiver. Each mobile unit utilizes the elevation, the slope and the angles of orientation of the laser plane at the (LAVSATPS) location and the received differential corrections data to obtain the precise coordinate measurements.

Yet, one more aspect of the present invention is directed to a method of guiding a plurality of mobile unit using the LASATPS system. In one embodiment, the LASATPS method comprises the following steps: (1) generating a laser beam having a reference laser plane with a high accuracy elevation; (2) determining the elevation of the laser reference plane using a stationary SATPS receiver; (3) sequentially transmitting to each mobile unit the elevation of the laser reference plane using a communication link between the LASATPS system and the mobile unit; and (4) updating the elevation data with a rotational frequency.

One additional aspect of the present invention is directed to a method of guiding a plurality of mobile units utilizing an integrated laser and vector satellite positioning guidance system (LAVSATPSAG). In one embodiment, the LAVSATPSAG method comprises the following steps: (1) generating a rotating laser beam, wherein the rotating laser beam provides a high accuracy dual slope reference laser plane; (2) determining an elevation, a slope and angles of orientation of the dual slope reference laser plane at the location of the laser system using a vector differential satellite positioning system (SATPS) receiver integrated with the laser system; (3) obtaining differential corrections data by using the vector differential SATPS receiver; (4) transmitting to each mobile unit the differential corrections data, the elevation, the slope and the angles of orientation of the laser plane at the location of the (LAVSATPS) using at least one communication link between the LAVSATPS system and the mobile unit; (5) obtaining raw positional data for each mobile unit using a mobile SATPS receiver; and (6) obtaining precise positional data for each mobile unit using the raw positional data, the differential corrections data, and the elevation, the slope and the angles of orientation of the laser plane at the (LAVSATPS) location.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Figure 1:
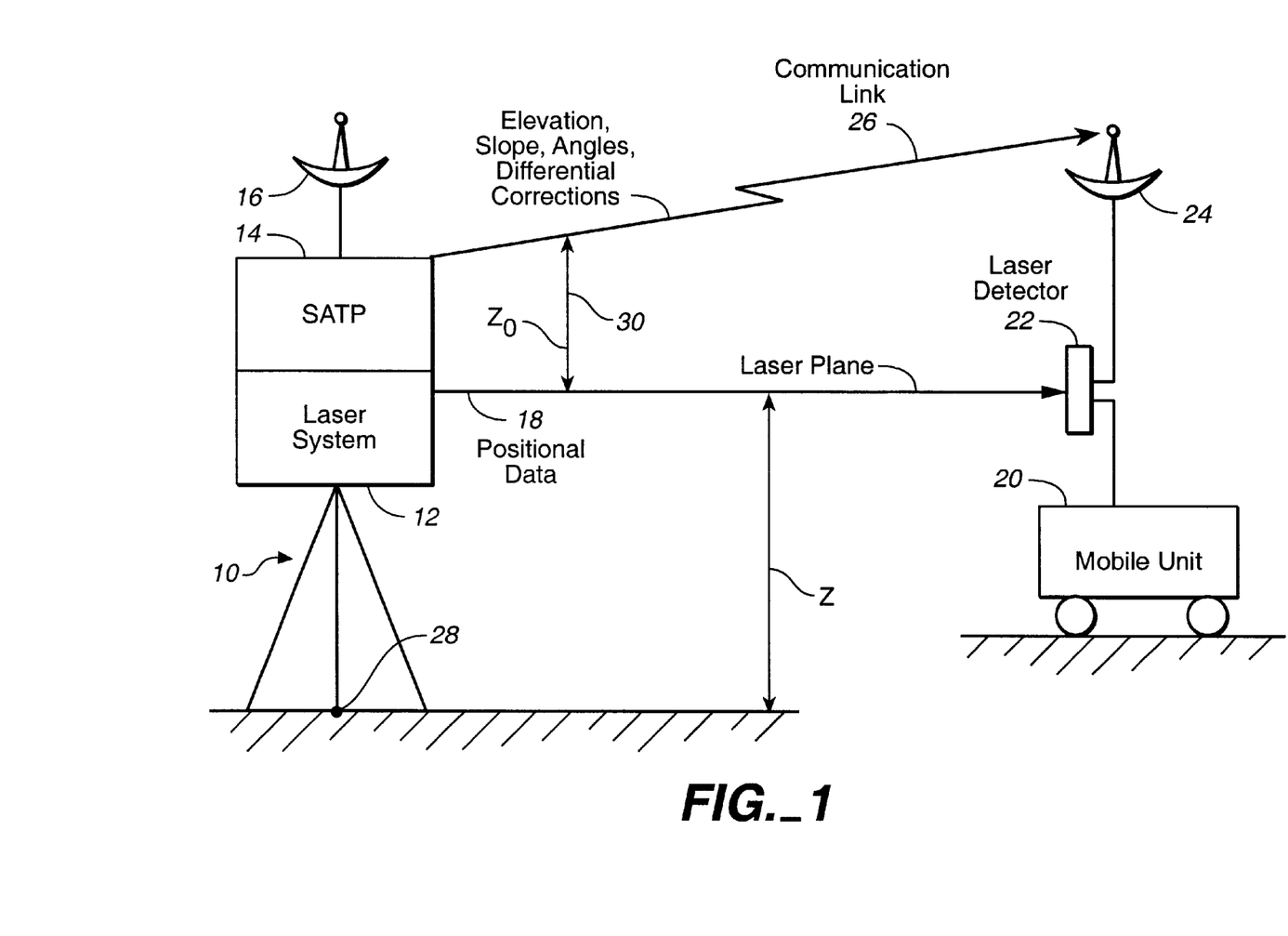
FIG. 1 depicts an integrated laser and satellite positioning system (LASATPS).

The present invention can be best understood by focusing on FIG. 1 that depicts an integrated laser and satellite positioning system (LASATPS) (10). The (LASATPS) system (10) comprises: (1) a laser system (12) generating a laser beam (18) and a satellite positioning system (SATPS) receiver (14) integrated with the laser system (18). The integrated laser and SATPS system (10) (LASATPS) provides a number of benefits to a potential user comparatively with a system that mechanically combines a laser system (see full description below) and a SATPS receiver system.

Indeed, the integrated LASATPS system has the reduced cost as opposed to the cost of the combined laser and SATPS system because the integrated LASATPS system requires only one set of packaging, can utilize a shared computer memory and can use a common power supply. In the integrated LASATPS system the laser beam and the electrical phase center of the SATPS stationary antenna ((16 of FIG. 1) are separated by a known and fixed distance, wherein in the mechanically combined system the distance between the laser beam and the electrical phase center of the SATPS stationary antenna ((16 of FIG. 1) is prone to errors because this distance is introduced by an operator of the integrated LASATPS system.

In one embodiment, the laser system (12) includes a rotating laser system. In a rotating laser system a laser source spins (mechanically, or optically) in the horizontal plane (or Z-plane). The rotating laser emits a laser beam that provides an accurate reference plane with a millimeter accuracy. However, to detect and get benefit of the rotating laser beam, the potential user has to be located within vertical range, and has to be equipped with a laser detector (or a laser receiver) capable of receiving the rotating laser beam. In the mechanical embodiment, the motor physically rotates the laser and accordingly the laser beam. In the optical embodiment, the mirror rotates in such a way that the physically non-rotating laser emits the rotating laser beam.

Topcon, Laser Systems, Inc., located in Pleasanton, Calif. manufactures Topcon RL-SI rotating laser systems with the following specifications: a laser source is a 633 nm visible diode with horizontal self leveling range of (+/−) 10 arc minutes, with vertical self leveling Range of (+/−) 10 arc minutes, with vertical accuracy of (+/−) 20 arc seconds, with horizontal accuracy of (+/−) 15 arc seconds, with operating range of (60–300) meters depending on the target's laser receiver. The RL-SI Topcon laser system generates a bright, self-leveling laser beam that can provide a precise horizontal reference plane (Z-plane) for horizontal leveling of ceiling grids. Topcon also manufactures an RL-H -horizontal laser system that provides extremely wide electronic self-leveling, long transmitting range and simple one-touch operation laser system. Topcon also produces an RL-H2S/RL-H1S Dual/Single slope laser system that generates a rotating laser beam providing a dual angle/single angle slope laser plane.

By integrating a satellite positioning system receiver (SATPS) (14) with a rotating laser system (12), an operator can determine in the case of the horizontal Z- laser plane as well as in the case of the dual-angle slope laser plane, the horizontal elevation of the laser beam at the known position (28) where the integrated system (10) is located. Indeed, the SATPS system receiver (14) having a satellite stationary antenna (16) exposed to the view of sky, can determine the z-coordinate of its stationary antenna. The distance (30) between the phase center of the stationary antenna and the laser beam ($z_0$) is known and fixed. Therefore, the elevation of the laser beam can be determined very precisely.

Thus, the LASATPS system (10) generates a laser beam (18) that can be used to track a single mobile unit (20). Indeed, the vertical coordinate Z of the laser beam (18) is determined with a high (mm) accuracy using the satellite receiver SATPS (14) and can be transmitted to the mobile unit (20) utilizing a communication link (26). It is necessary to mention that even the most precise real time kinematic (RTK) differential GPS receiver (see full discussion below) nowadays can determine the absolute vertical (Z) coordinate of the laser beam with only a cm accuracy. However, the relative determination of the vertical (Z) coordinate of the laser beam using the LASATPS system can be done with a mm accuracy. Thus, in the following discussion by mentioning a mm laser beam vertical coordinate (or a mm laser plane Z-coordinate accuracy) we would mean only the relative accuracy.

In one embodiment, the satellite positioning system can comprise a global positioning system (GPS). The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHZ (nineteen centimeter carrier wavelength) and an L2 signal having a frequency f2=1227.6 MHZ (twenty-four centimeter carrier wavelength). These two frequencies are integral multiplies f1=1,540 of and f2=1,200 f0 of a base frequency f0=1.023 MHZ. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below. Use of PRN codes allows use of a plurality of GPS satellite signals for determining an observer's position and for providing the navigation information.

A signal transmitted by a particular GPS satellite is selected by generating and matching, or correlating, the PRN code for that particular satellite. Some of the PRN codes are known and are generated or stored in GPS satellite signal receivers operated by users. A first known PRN code for each GPS satellite, sometimes referred to as a precision code or P-code, is a relatively long, fine-grained code having an associated clock or chip rate of f0=10.23 MHZ. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHZ. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.80° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+ 7k/16) GHz, where k (=1,2, . . . 24) is the channel or satellite number. These frequencies lie in two bands at 1.597–1.617 GHz (L1) and 1,240–1,260 GHz (L2). The L1 signal is modulated by a C/A-code (chip rate=0.511 MHZ) and by a P-code (chip rate=5.11 MHZ). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention. A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite. After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

The following discussion is focused on a GPS receiver, though the same approach can be used for a GLONASS receiver, for a GPS/GLONASS combined receiver, or any other SATPS receiver.

In one embodiment, the SATPS receiver (14) can comprise an autonomous GPS receiver that can be implemented using a single frequency 4600 LS GPS TRIMBLE receiver. The autonomous receiver utilizes the absolute positioning method to obtain its position with an accuracy of 10–100 meters. In an alternative embodiment, the SATPS receiver (14) can comprise a differential GPS receiver. In this embodiment, a configuration of two or more receivers can be used to accurately determine the relative positions between the receivers or stations.

In differential position determination, many of the errors in the SATPS signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. (See discussion above about the relationship between the absolute and relative accuracy of the integrated laser and GPS receiver system). The differential GPS receiver can include: (a) a real time code differential GPS; (b) a post-processing differential GPS; (c) a real-time kinematic (RTK) differential GPS that includes a code and carrier RTK differential GPS receiver.

The differential GPS receiver can obtain the differential corrections from different sources. In one embodiment, the differential GPS receiver can obtain the differential corrections from a Reference (Base) Station. The fixed Base Station (BS) placed at a known location determines the range and range-rate measurement errors in each received GPS signal and communicates these measurement errors as corrections to be applied by local users. The Base Station (BS) has its own imprecise clock with the clock bias $CB_{BASE}$. As a result, the local users are able to obtain more accurate navigation results relative to the base station location and the base station clock. With proper equipment, a relative accuracy of 5 meters should be possible at distances of a few hundred kilometers from the Base Station.

In another embodiment, the differential GPS receiver can be implemented using a TRIMBLE Ag GPS -132 receiver that obtains the differential corrections from the U. S. Cost Guard service free in 300 kHz band broadcast. In this embodiment, the integrated SATPS and laser system (10) should be placed within (2–300) miles from the U. S. Cost Guard Base Station. The accuracy of this differential GPS method is about 50 cm.

In one more embodiment, the differential corrections can be obtained from the Wide Area Augmentation System (WAAS). The WAAS system includes a network of Base Stations that uses satellites (initially geostationary satellites-GEOs) to broadcast GPS integrity and correction data to GPS users. The WAAS provides a ranging signal that augments the GPS, that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is less than 1 meter.

In an additional embodiment, three satellite commercial services that broadcast the differential corrections can be used: (1) Omnistar, (2) Racal, (3) Satloc, and (4) the satellite system operated by the Canadian Government. The accuracy of this method is (10–50) cm.

Yet, in one more embodiment, the real time kinematic (RTK) differential GPS receiver can be used to obtain the position locations with less than 2 cm accuracy. The RTK differential GPS receiver receives the differential corrections from a Base Station placed in a know location within (10–50) km from the local user. For the high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, that is the problem of determining the number of whole cycles of the carrier satellite signal between the GPS satellite being observed and the RTK GPS receiver. Indeed, the error in one carrier cycle L1 (or L2) can change the measurement result by 19(or 24) centimeters, which is an unacceptable error for the centimeter-level accuracy measurements.

In one embodiment, the laser system can generate a dual-slope laser plane. In this embodiment, the integrated GPS receiver-laser system should preferably include a "vector" GPS receiver capable of determining the attitude of a dual-slope laser plane. A "vector" GPS receiver is disclosed in the U.S. Pat. No. 5, 268, 695 issued to Dentinger et al. This patent is incorporated herein in its entirety.

The vector GPS receiver includes a system for time multiplexing a carrier signal received by two or more GPS antennas through a single hardware path, using a single receiver's oscillator in that hardware path as a reference to compare the phase from each antenna. One of the antennas is designated as a reference antenna and a carrier signal received by it is used to phase lock in a numerically controlled oscillator. The same carrier signal received by the other antennas is periodically compared in phase to the output of the numerically controlled oscillator. Each comparison results in a phase angle measurement for the respective antennas compared to the master antenna.

The communication link (26) can be implemented using a variety of different embodiments. In general, the communication link can employ a radiowave frequency band, an infrared frequency band, or a microwave frequency band. In one embodiment, the communication link can include the ISM (industrial scientific medical) unlicensed operation band, including 900 MHZ, 2.4 GHz, or 5.8 GHz bands, wherein the user can own both ends of the ISM communication system. The ISM technologies are manufactured by Trimble Navigation Limited, Sunnyvale, Calif. Metricom, Los Gatos, Calif. and by Utilicom, Santa Barbara, Calif.

In another embodiment, the communication link can employ a 1.8 GHz band that supports the personal communications services (PCS). The PCS uses the international standard DCS-1800. Yet, in one more embodiment, the communication link can include a real time circuit switched communication link. For instance, the communication link employing a real time circuit switched communication link can include the Iridium satellite system produced by Motorola, Schaumburg, Ill.

In one additional embodiment, the communication link can employ a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20–30) GHz range are manufactured by Cellular Communications located in Redmond, Washington, and the LEOS systems in (1.6–2.5) GHz range are produced by Loral/Qualcomm located in San Diego, Calif.

The communication link can include a cellular telephone communication means, a paging signal receiving means, wireless messaging services, wireless application services, a wireless WAN/LAN station, or an Earth-satellite-Earth communication module that uses at least one satellite to relay a radiowave signal. The communication link can also include the cellular telephone communication means that can include an Advanced Mobile Phone System (AMPS) with a modem. The modem can comprise a DSP (digital signal processor) modem in 800 MHZ range, or a cellular digital packet data (CDPD) modem in 800 MHZ range. The cellular digital communication means includes a means of modulation of digital data over a radiolink using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

In one additional embodiment, the laser beam itself can provide a communication link (26) to transmit to a number of mobile units the elevation of a laser plane (Z-plane) is determined with a mm accuracy. In this embodiment, the time of interaction of the laser beam with each mobile unit should be long enough so that the modulated laser beam can transmit, and the laser detector (22 of FIG. 1) mounted on each such mobile unit (20) can read the laser plane data information.

Each mobile unit is equipped with a laser receiver. Each laser receiver comprises a number of diodes. A laser receiver measures the signal strength on a number of diodes to determine the center of a laser beam. Topcon, Laser Systems, Inc., located in Pleasanton, Calif. manufactures machine mounted laser receivers: 9130 laser tracker and LS-B2 laser receiver.

The modulation and demodulation of the laser beam can be easily achieved. Indeed, it is well known to those skilled in the art, that there are infrared emitting and lasing diodes that can be easily modulated and demodulated. J. M. Rueger in the "Electronic Distance Measurement", published by Springer-Verlag, Germany, in 1996, provides valuable introduction into this subject. This book is referred to in the following discussion.

Infrared emitting and lasing diodes provide a low cost, light weight, small, low voltage and low current alternative to gas lasers. Infrared diodes can be classified according to their structure, operation, manufacturing process and direction of emission. All devices feature an active region (or laser cavity) which consists typically of undoped low-bandgap material surrounded by higher bandgap n-type (donor) and p-type (acceptor) material.

In the GA Al As emitting diode under forward bias, electrons from the n-region and holes from the p-type region are injected into the active region. The confinement of these carriers to the active region is achieved by the energy barriers and refractive index steps at each heterojunction. This confinement leads to electron-hole recombination in the active layer that generates spontaneous and incoherent infrared emission in all directions. The external quantum efficiency of such LED's (Light Emitting Diodes), namely the ratio of emitted photons to input electrical power, is only a few percent. The high refractive index of the Ga Al As semiconductor material (3.5 to 3.6) causes most of the radiation to be reflected (by total reflection) at the semiconductor/air interfaces and absorbed internally. The Ga Al As emitting diode emits wavelengths between 710 and 900 nm.

The working principles of lasing diodes are as follows. Each photon generated within the active layer can stimulate the recombination of additional electron-hole pairs to emit photons that are coherent, that is they have the same wavelength and phase. With increased injection current, the gain due to the stimulation emission can approach and then exceed the absorption losses in the active layer. The device becomes an amplifier and exhibits a narrowing of the emitted spectrum as well as an abrupt increase of radiated power (lasing). Amplification is greater parallel to the active layer. Because of the basically linear relationship between input (injection) current and output power (radiant flux) of infrared emitting diodes (over entire operating range) and lasing diodes (specific regions below and above threshold current only), the infrared output beam can be easily directly modulated. For example, a sinusoidal variation of the drive current between 10.2 A and 11.8 A leads to a sinusoidal modulation of the output power between 0.2 W and 0.75 W.

The direct demodulation can be performed by utilizing photodiodes that have the property of transforming radiation into electrical current: the higher the radiation power, the higher the current flow through the diode. The silicon (PIN) photodiodes or Si-avalanche photodiodes (APD) can be used for the purpose of direct demodulation of the modulated laser beam.

The indirect modulation may be achieved by passing a continuous light beam through two polaroid filters of perpendicular polarization planes. Between the two filters the plane of the polarized light can be rotated by a Kerr cell in phase with a modulation signal. This results in an amplitude modulated light beam emerging from the second filter. Photomultiplier can achieve the conversion of light into electric current and can be used for the indirect demodulation.

Figure 2:
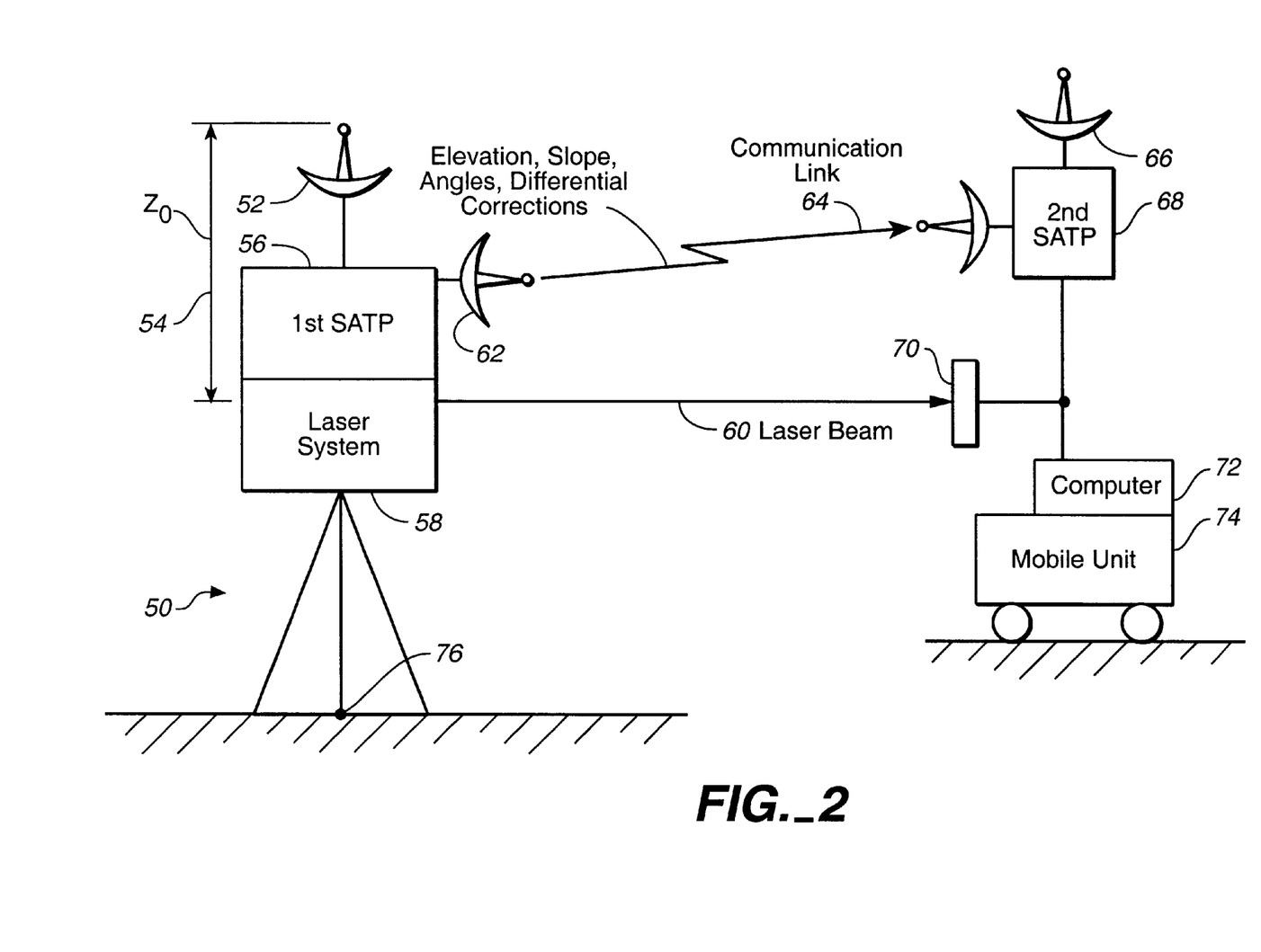
FIG. 2 shows an integrated laser and satellite positioning guidance system (LASATPSAG) comprising an integrated laser and satellite positioning system (LASATPS), a mobile unit including a laser detector and a mobile satellite positioning system (SATPS) receiver, and a communication link.

In the preferred embodiment of the present invention, as depicted in FIG. 2, an integrated laser and satellite positioning guidance system (LASATPAG) comprises: (1) an integrated laser and satellite positioning system (LASATPS) (50) positioned in a location with known coordinates (76), a mobile unit (74) including a laser detector (70) and a mobile satellite positioning system (SATPS) receiver (68), and a communication link (64) between the LASATPS system (50) and a mobile unit (74).

In one embodiment, the integrated laser and satellite positioning system (LASATPS) (50) positioned in a location with known coordinates (76) comprises a satellite positioning system (SATPS) receiver (56) integrated with the laser system (58). The SATPS receiver (56) has a stationary antenna (52) exposed to the view of sky. The LASATPS system (50) of FIG. 2 is substantially the same system as the discussed above LASATPS system (10) of FIG. 1. Thus, the distance $z_0$ (54) between the electrical phase center of the stationary antenna (52) and the laser beam (60) is known and fixed.

In another embodiment, the integrated laser and satellite positioning system (LAVSATPS) (50) positioned in a location with known coordinates (76) comprises a rotating laser system generating a dual slope laser beam (58) and a "vector" GPS receiver (56) integrated with the laser system (58). The vector GPS receiver (56) has been fully disclosed above. Specifically, the vector GPS receiver can determine the attitude of the dual slope laser beam. The distance $z_0$ (54) between the electrical phase center of the master stationary antenna (52) and the laser beam (60) is known and fixed.

There are several techniques to determine the known location of the integrated laser and SATPS receiver system. In one embodiment, the known coordinates of the integrated laser and SATPS receiver system can be determined using the differential SATPS receiver of the integrated system and a single base station. In another embodiment, the known coordinates of the integrated laser and SATPS receiver system can be determined using the differential SATPS receiver of the integrated system and a network of base stations, including a WAAS system disclosed above.

In one embodiment of the present invention, each mobile unit (74) includes a mobile SATPS satellite receiver (68), and a laser receiver(detector) (70). In an alternative embodiment of the present invention, each mobile unit (74) includes a mobile SATPS satellite receiver (68), a laser receiver (detector) (70), and a computer (72). The mobile SATPS receiver can comprise a GPS receiver, a GLONASS receiver, a combined GPS/GLONASS receiver, or any other satellite receiver.

In one embodiment of the present invention, the LASATPS system (50) generates a laser beam (60) that can be used to track a mobile unit (74). In this embodiment, the vertical coordinate Z of the laser beam (60) determined with a high mm (relative) accuracy using the satellite receiver SATPS (56) is transmitted to the mobile unit (74) utilizing a communication link (64).

In an alternative embodiment of the present invention, the LASATPS system (50) generates a rotating laser beam (60) that can be used to track a plurality of mobile units (74). In this embodiment, the LASATPS system provides a laser plane. The elevation Z of the laser plane (or Z-plane) determined with a high mm (relative) accuracy using the satellite receiver SATPS (56) is transmitted to each mobile unit utilizing at least one communication link (64).

Yet, in one more embodiment, the LAVSATPS system (50) generates a dual slope laser plane using a rotating laser beam (60). In this embodiment, the elevation Z of the laser plane (or Z-plane) at the location (76) of the LAVSATPS system, the slope and angles of orientation are determined using a vector SATPS receiver and transmitted to each mobile unit utilizing at least one communication link (64). In this embodiment, each mobile unit (74) utilizes its own mobile satellite receiver SATPS (68) in order to determine the distance between the mobile unit and the LAVSATPS system that can be used to determine the elevation of the dual slope laser plane at the location of the mobile unit.

In one embodiment, the SATPS receiver comprises a differential satellite receiver, and the LASATPS system (50) comprises a Base Station that transmits differential corrections data to each mobile unit (74) using at least one communication link (64). Different methods of obtaining differential correction data were fully discussed above.

In one LAVSATPS embodiment, each mobile unit (74) can obtain the elevation data of the Z-laser plane with mm (relative) accuracy, and its (x, y) positional data with 50 cm accuracy using its own mobile satellite receiver (68) and the differential correction data transmitted from the LASATPS station (50). In an alternative LAVSATPS embodiment, the SATPS receiver comprises a real time kinematic (RTK) differential SATPS receiver, and the LASATPS system (50) comprises a real time kinematic (RTK) Base Station that transmits real time differential corrections data with 2 cm accuracy to each mobile unit (74) using at least one communication link (64). In this LAVSATPS/RTK embodiment, each mobile unit (74) can obtain the elevation data of the Z-laser plane with mm accuracy, and its (x, y) positional data with 2 cm accuracy using its own mobile satellite receiver (68) and the real time differential correction data transmitted from the LASATPS station (50). At least one communication link (64) can comprise a radio link, a wireless link, a laser beam (60) itself. The full disclosure of all embodiments for at least one communication link (64) of FIG. 2 was given above.

The angle and distance measuring technique and principles that allow one to measure the distances, dual slope plane angles, and angles of orientation, are extensively used and relied upon in the given above full description of the preferred embodiments of the present invention. The U.S. Pat. No. 5,784,155, entitled "Laser survey instrument", discloses the basic distance and angle measuring principles and techniques. The following discussion focused on basic measuring techniques and principles follows the '155 patent, that is incorporated herein in its entirety.

Figure 3:
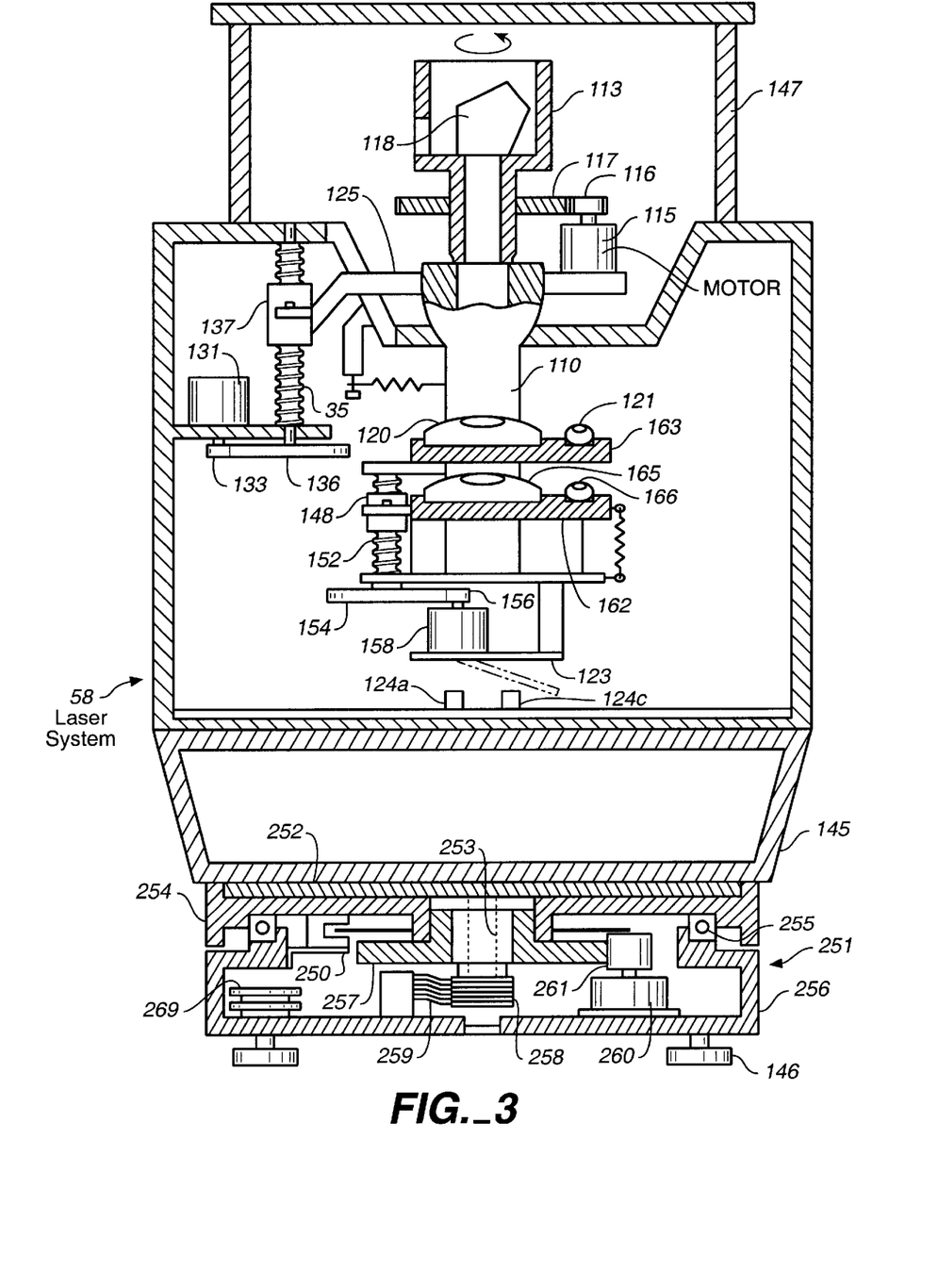
FIG. 3 is a cross-sectional view of a mechanical portion of the LASATPS system.

As was stated above, the LAVSATPS system (50) generates a dual slope laser plane using a rotating laser beam (60). FIG. 3 depicts a mechanical portion of the laser system (58) that generates (mechanically) rotational laser beam (60).

A laser system rotator (251) is mounted under a battery box (145). A rotation base (252) is fixed on the lower surface of the battery box (145). A rotating shaft (253) is protruded downward from the rotation base (252). A rotation frame (254) is fixed on the rotation base (252), and the rotation frame (254) is rotatably mounted on a hollow fixed frame (256) via a bearing (255). The rotating shaft (253) passes through the rotation frame (254). A rotating gear (257) is fixed on the rotating shaft (253), and a slip ring (258) is engaged on the forward end of the rotating shaft (253). A contact (259) contacts the slip ring (258). The driving electric power and control signals are supplied from the main unit (58) via the slip ring (258) and the contact (259). A rotating motor (260) is placed on the bottom surface of the fixed frame (256). An output gear (261) engaged with an output shaft of the rotating motor (260) is also engaged with the rotating gear (257).

An encoder (250) is placed between the rotation frame (254) and the fixed frame (256). An angle between the rotation frame (254) and the fixed frame (256), i.e. relative rotating angle of the rotating laser system (58) with respect to the fixed frame (256), is detected by the encoder (250). The detected rotating angle is inputted to a rotation controller (269). The rotating motor (260) is driven by the rotation controller (269), therefore the rotation of the laser system (58) is controlled. On the lower surface of the fixed frame (256), bolt holes (not shown) for mounting on a tripod are formed. The fixed frame (256) is mounted on the tripod (not shown) via the bolt holes. Reference numeral (146) represents a bolt for leveling adjustment.

Figure 4:
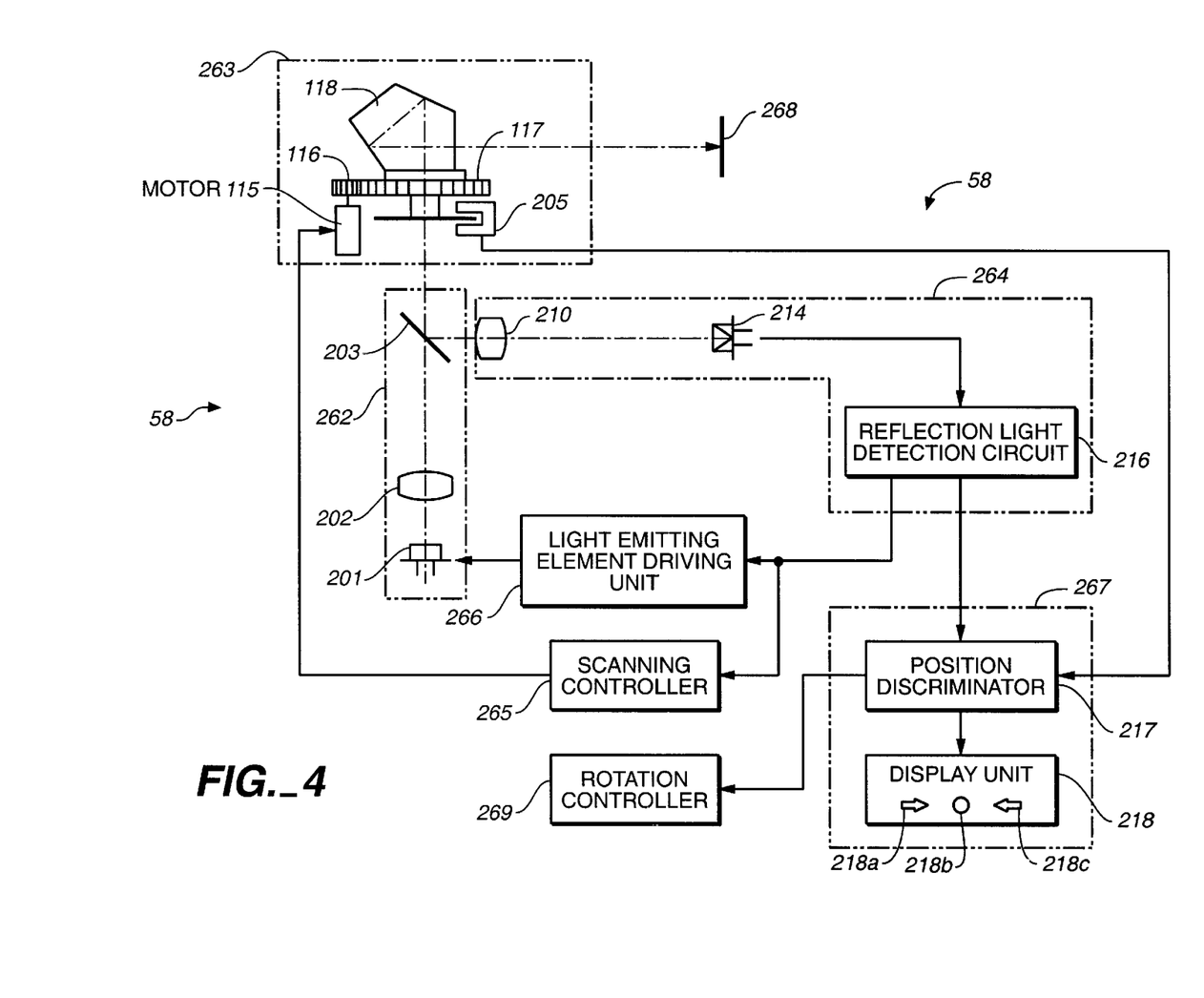
FIG. 4 is a block diagram of an optical system and control system employed in the LASATPS system.

FIG. 4 is a block diagram of an optical system and control system employed in the laser subsystem (58 of FIG. 2). The laser subsystem (58) comprises an emitter (262), a rotating unit (263), a reflection light detector (264), a scanning controller (265), a light emitting element driving unit (266), and an alignment display unit (267).

The emitter (262) includes the following structure. On the optical axis of a laser diode (201), a collimator lens (202) and a perforated mirror (203) are arranged in this order as seen from the laser diode (201). Laser beam emitted from the laser diode (201) is turned to parallel beams through the collimator lens (202). The parallel laser beams are directed toward the rotating unit (263) through the perforated mirror (203). Light beam is emitted from the laser diode (201) by the light emitting element driving unit (266).

In one embodiment of the present invention, the light is modulated by the light emitting element driving unit (266), as was explained above. Thus, the modulated laser beam emitted from the laser diode (201) can be discriminated from the other external light.

The rotating unit (263) directs the laser beam (60 of FIG. 2) emitted from the emitter (262) in horizontal direction for scanning. A pentagonal prism (118) for deflecting optical axis of the laser beam from the emitter (262) by an angle of 90° is supported in such manner that it can be rotated around the optical axis of the emitter (262). The pentagonal prism (118) is rotated by the scanning motor (115) via a gear (116) and a scanning gear (117). An encoder (205) is provided with respect to the rotating shaft of the pentagonal prism (118).

The encoder (205) comprises a rotor (209) and a detector (207). The encoder (205) is an incremental encoder equipped with an index (208) for showing a reference position as depicted in FIGS. (5B–E). By counting an output from the reference position given by the index (208), an angle from the reference position can be detected. The index (208) for showing the reference position is arranged in such manner that it is detected by the detector (207) when irradiating direction of the rotating laser beam is aligned with tilting direction of the tilt setting mechanism (as depicted in FIG. 3), i.e. when the laser beam (60 of FIG. 2) is in parallel to the arbitrary angle setting bubble tube (165 of FIG. 3).

The laser reflector (70 of FIG. 2 and of FIGS. 5A–5E) reflects the laser beam (60 of FIG. 2) toward the rotating unit (263) when the laser beam emitted from the rotating unit (263) is irradiated.

Figure 6A:
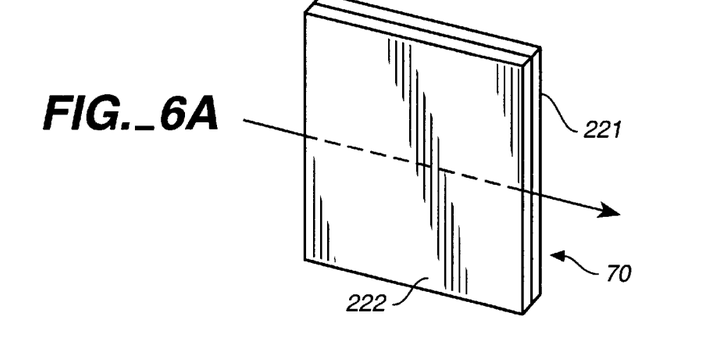
FIGS. 6A–6B depict one type of a laser reflector.
Figure 7A:
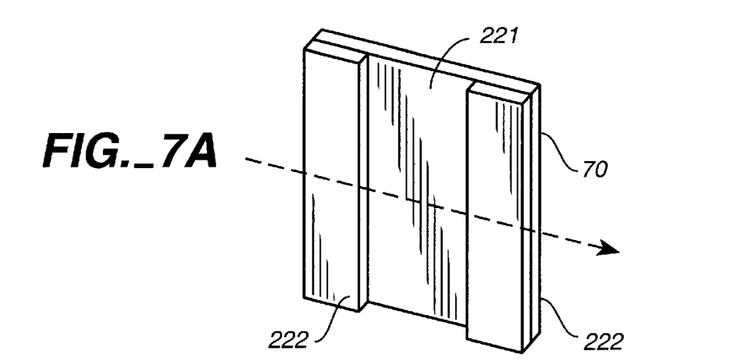
FIGS. 7A–7B illustrate another type of a laser reflector.

Different types of a laser reflector (70) are shown in FIGS. 6A and 7A. The laser reflector shown in FIG. 6A has a reflection layer (222) on a substrate (221) and reflects the light from the rotating unit (263) so that the light enters the rotating unit (263) again. The reflection layer (222) is a retroreflective surface, comprising beads, very small prisms, etc. On the other hand, the laser reflector (70 of FIG. 2) shown in FIG. 7A includes reflection layers (222) that are arranged on two lateral portions of the substrate (221). Thus, there are two reflection layers to easily discriminate between reflection from the laser reflector (70) and reflection from a foreign reflecting object.

Figure 6B:
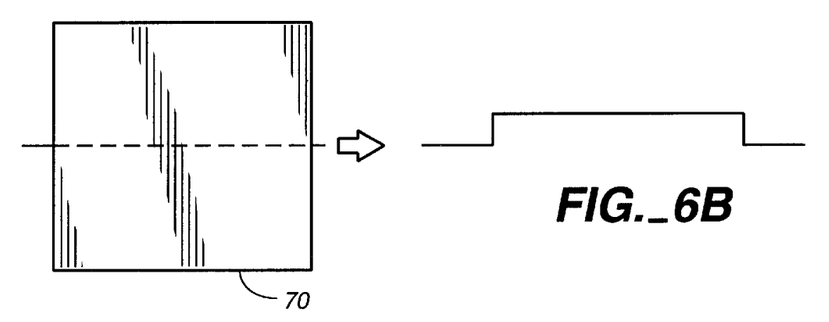
Figure 7B:
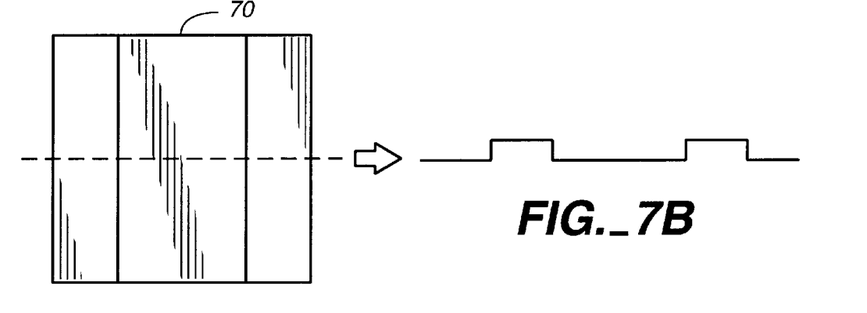

When the laser reflector (70 of FIG. 6A) is scanned by the laser beam (60 of FIG. 2), the laser beam reflected from the laser reflector (70 of FIG. 6A) is turned to pulse-like beam having the same width as that of the object reflector (70) as shown in FIG. 6B. On the other hand, when the laser reflector (70 of FIG. 7A) is scanned by the laser beam, the laser beam reflected from the laser reflector (70 of FIG. 7A) exhibits two-pulse form (as depicted in FIG. 7B) varied from the form of the beam of FIG. 6B, lacking the intermediate portion.

The laser beam (60 of FIG. 2) reflected from the object reflector (70) enters the pentagonal prism (118 of FIG. 4). Upon entering the pentagonal prism (118), the reflection laser beam is deflected toward the perforated mirror (203), and the perforated mirror (203) directs the reflection laser beam toward the reflection light detector (264).

Referring still to FIG. 4, the first photodetector (214) receives the reflection laser beam from the laser reflector (70), wherein the path of the reflected laser beam includes a perforated mirror (203), a condenser lens (210) and a first photodetector (214) comprising a photodiode. The output from the first photodetector (214) is inputted to a reflection light detection circuit (216). The reflection light detection circuit (216) is equipped with an electric filter (not shown) for detecting photodetection signals of the laser beam. The first photodetector (214) extracts the detected modulated laser beam from the other external light. The extracted modulated laser signal is processed (e.g. amplified), and outputted to the alignment display unit (267).

Referring still to FIG. 4, the alignment display unit (267) comprises a position discriminator (217) and a display unit (218). A signal showing photodetection status of the first photodetector (214) from the reflection light detection circuit (216) is inputted to the position discriminator (217), and an angle signal from the encoder (205) for detecting rotating position of the pentagonal prism (118) on the rotating unit (263) is inputted. The angle signal from the encoder (205) is an angle signal of the encoder (205) corresponding photodetection status when the reflection laser beam from the object reflector (268) is received. Therefore, by obtaining the signal of the encoder (205) at leading and trailing edges of the signal (FIG. 6B) obtained by receiving the reflection laser beam from the laser reflector (70 of FIG. 6), and an angle signal from the reference position, it is possible to easily detect the position of the center of gravity of the laser reflector (70), and accordingly, the center of the mobile unit (74 of FIG. 2).

In the alternative embodiment for the laser reflector (70 of FIG. 7), by obtaining the signal of the encoder (205) at leading and trailing edges of the signal (FIG. 7B) obtained by receiving the reflection laser beam, and an angle signal from the reference position, it is possible to detect position of the center of gravity of the laser reflector (70), and accordingly, the center of the mobile unit (74 of FIG. 2).

The position discriminator (217) calculates the position of the center of gravity of the photodetection signal, i.e. the center of the laser reflector (70), from the photodetection signal of the reflection light detection circuit (216) and the angle signal of the encoder (205). The result of the calculation is inputted to the display unit (218) and the rotation controller (269). If the direction of the laser beam (60) is deviated, the display unit (218) indicates the corrected direction of the laser beam by arrows (218a or 218c). Further, in case when the laser system (58) is accurately positioned face-to-face to the laser reflector (70), it is indicated by a display indicator (218b) at the center.

Figure 5A:
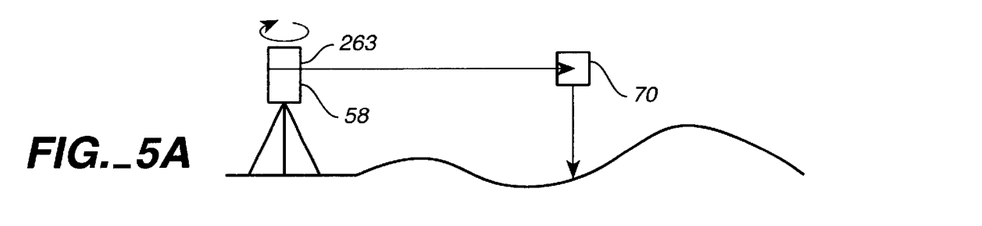
FIGS. 5A–5F are drawings for showing operation of the LASATPS system.
Figure 5B:
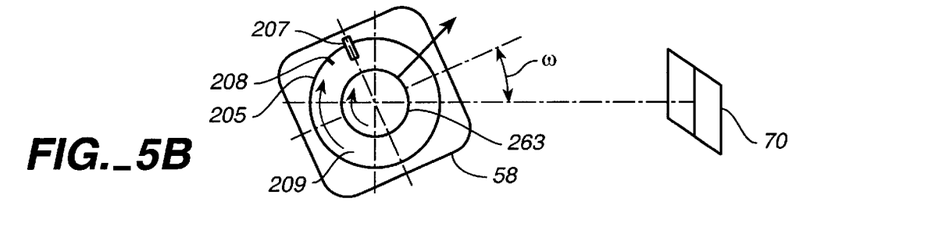

After horizontal leveling operation of the laser subsystem (58) has been completed (FIG. 5A), the rotating unit (263) is rotated by the scanning motor (115), and the laser beam emitted from the emitter (262) is scanned on the horizontal plane. Rotating position of the rotating unit (263) is detected by the encoder (205). On a rotating plate of the encoder (205), which is integrally rotated with the rotating unit (263, a main scale for issuing angle pulses and an index (208) for showing reference position are marked. A detector (207) on the encoder (205) on the fixed side of the laser system (58) issues angle pulses by the main scale and a reference position pulse by the index (208). Mechanical relation between the encoder (205) and the main unit is set in such manner that the laser beam is directed substantially toward tilting direction of the tilt setting mechanism. The laser system (58) is not accurately facing toward the laser reflector (70) generally, and is deviated by an angle of ω counterclockwise as shown in FIG. 5B.

Figure 5C:
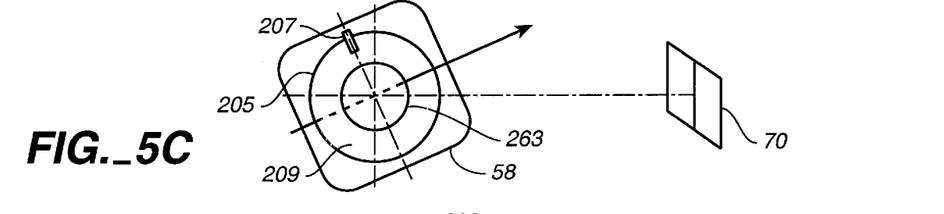
Figure 5D:
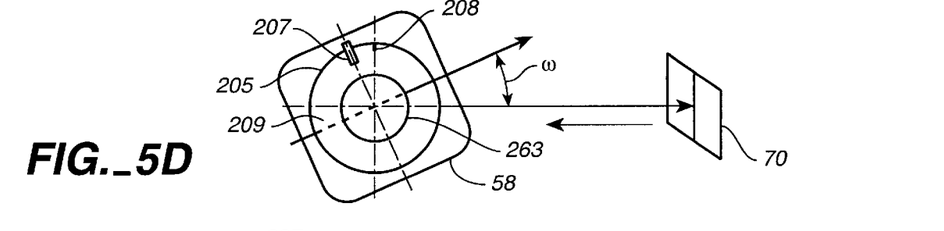
Figure 5E:
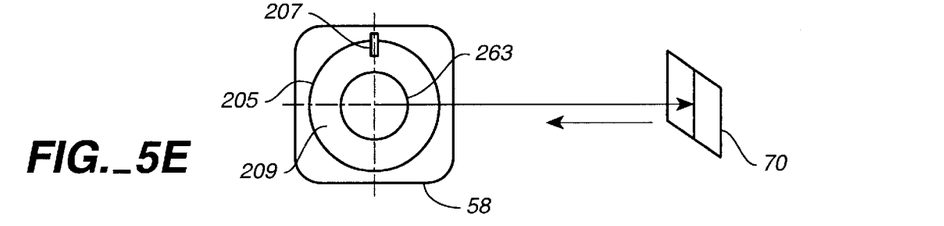

When the laser beam scans the plane and the rotating unit (263) is rotated, the detector (207) detects the index (208). Then, the reference position is confirmed, and a rotating angle of the rotating unit (263) is detected by the encoder (205) from the detected position (FIG. SC). Further, the rotating unit (263) is rotated, and when the laser beam passes through the laser reflector (70), the reflection laser beam from the laser reflector (70) enters the reflection light detector (264) via the rotating unit (263) and the perforated mirror (203), and the first photodetector (214) issues photodetection signal. The reflection light detection circuit (216) extracts the photodetection signal containing only the laser beam and outputs it to the position discriminator (217). At the position discriminator (217), the center position of the laser reflector (70) is calculated, and an angle signal from the encoder (205) relating to the center position is read. This angle is the angle o (FIG. 5D). The direction or the amount relating to c is indicated by the arrow (218a), the display indicator (218b), or the arrow (218c). The angle signal ω is inputted to the rotation controller (269). The rotation controller (269) issues a driving signal to the rotating motor (260) to drive it, and the rotating motor (260) rotates the rotating laser system toward the direction to be corrected via the output gear (261) and the rotating gear (257). The rotating angle is detected by the encoder (250), and the rotating motor (260) is stopped when the angle detected by the encoder (250) is turned to o (FIG. 5E).

Figure 5F:
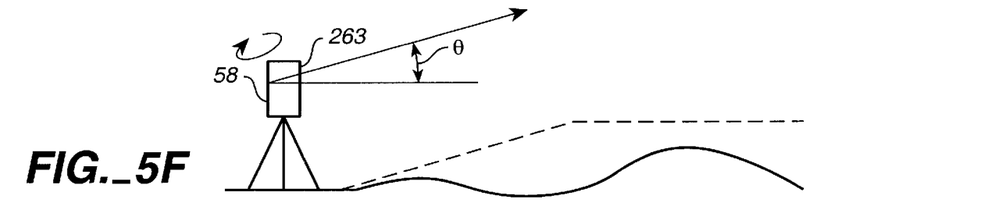

On the other hand, when the laser system (58) is accurately faced toward the laser reflector (70), an angle of elevation θ is set, and the scanning motor (115) is driven to irradiate the laser beam for scanning. Then, a reference plane tilted by the angle of elevation 0 with respect to the target is formed (FIG. 5F).

Referring back to FIG. 2, in one embodiment of the present invention, the operator sitting in the mobile unit (74) can utilize the high precision positional data to operate the mobile unit (74). In another embodiment, the computer (72) included in the mobile unit (74) can utilize the high precision positional data to operate the mobile unit (74). In both embodiments, the z-coordinate is known with mm (relative) accuracy that allows the mobile unit operated by the computer or by human to perform the mm-precision grade, earth moving, or any other operations that require mm (relative) accuracy in z-plane. The accuracy in (x, y) directions is determined by the accuracy of the RTK GPS receiver (56) which is presently only 2 cm. The progress in the RTK GPS receivers may significantly increase the accuracy in the (x, y) directions in the future applications.

There are also several modes of operations of the system (50) of FIG. 2. In one mode of operation, wherein the LASATPS system can track a single mobile unit, a laser beam having a high accuracy vertical coordinate is generated using system (50). The vertical coordinate of the laser beam is determined using the SATPS receiver (56). The differential corrections can be determined using the SATPS differential receiver (56). The vertical coordinate of the laser beam and the differential corrections data can be transmitted using a communication link (64) to the mobile unit (74). The raw positional data of the mobile unit can be determined using a mobile SATPS receiver (68). The precise positional data of the mobile unit can be determined utilizing the raw positional data, the differential corrections data, and the laser beam precise vertical coordinate. The precise positional data can be utilized by a human operator sitting in the mobile unit or by a computer included in the mobile unit.

In another mode of operation the LASATPS system can guide a plurality of mobile unit. A laser plane having a high accuracy vertical coordinate can be generated using a rotating laser beam of system (50). The elevation of the laser plane can be determined using the SATPS receiver (56). The differential corrections can be determined using the differential SATPS receiver (56). The elevation of the laser plane and the differential corrections can be transmitted using a communication link (64) to each mobile unit (74). The raw positional data for each mobile unit can be determined using the mobile SATPS receiver (68). The precise positional data of each mobile unit can be determined utilizing the raw positional data, the differential corrections data, and the laser plane elevation data precise vertical coordinate. The precise positional data can be utilized by a human operator sitting in a mobile unit or by a computer included in a mobile unit.

In one additional mode of operation the LAVSATPS system, including a rotating laser system generating a dual slope laser plane and a vector GPS receiver, can guide a plurality of mobile unit. The attitude of a dual slope laser plane can be generated using the vector GPS receiver. The differential corrections can be determined using the differential vector GPS receiver (56). The laser plane data and the differential corrections data can be transmitted using a communication link (64) to each mobile unit (74). The raw positional data for each mobile unit can be determined using a mobile SATPS receiver (68). The precise positional data of each mobile unit can be determined utilizing the raw positional data, the differential corrections data, and the laser plane data. The precise positional data can be utilized by a human operator sitting in a mobile unit or by a computer included in a mobile unit. The laser plane data and differential corrections data can be updated with the frequency of rotation of the rotating laser beam. In one embodiment, the rotational frequency is (10–20) Hz.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An integrated laser and satellite positioning guidance system (LASATPSAG) comprising:
    an integrated laser and satellite positioning system (LASATPS) positioned in a location with known coordinates, said LASATPS system comprising:
        a laser system generating a laser beam, said laser beam providing a high accuracy vertical coordinate; and
        a stationary satellite positioning system (SATPS) receiver integrated with said laser system, said stationary SATPS receiver having a stationary antenna exposed to the view of sky, wherein the distance between the phase center of said stationary antenna and said laser beam is known and fixed;
    a mobile unit including a laser detector and a mobile satellite positioning system (SATPS) receiver; and
    a communication link between said LASATPS system and said mobile unit; wherein said communication link is used to continuously transmit to said mobile unit the vertical coordinate of said laser beam and differential corrections obtained by said stationary SATPS receiver, and wherein said mobile SATPS receiver utilizes said differential corrections to obtain the precise coordinate measurements of said mobile unit.

2. An integrated laser and satellite positioning guidance system (LAVSATPSAG) comprising:
    an integrated laser and vector satellite positioning system (LAVSATPS) positioned in a location with known coordinates, said LAVSATPS system comprising:
        a laser system generating a rotating laser beam, said rotating laser beam providing a high accuracy dual slope reference laser plane; and
        a vector differential satellite positioning system (VSATPS) receiver integrated with said laser system, said vector differential VSATPS receiver having a master stationary satellite antenna and a plurality of slave stationary satellite antennas exposed to the view of sky, wherein said vector differential VSATPS receiver is capable of determining the attitude of said dual slope reference laser plane, and wherein the distance between a phase center of said master stationary satellite antenna and said reference laser plane is known and fixed;

a plurality of mobile units, each said mobile unit including a laser detector and a navigational device including a mobile satellite positioning system (SATPS) receiver; and a plurality of communication links between said LAV-SATPS system and each said mobile unit;

wherein at least one said communication link is used to transmit to one said mobile unit an elevation, a slope and angles of orientation of said laser plane at the location of said (LAVSATPS) and differential corrections obtained by said vector differential SATPS receiver;

and wherein for each said mobile unit one said navigational device utilizes a set of data including a set of positional data obtained by one said mobile SATPS receiver, said elevation, said slope and said angles of orientation of said laser plane at the (LAVSATPS) location, and said differential corrections data in order to obtain the precise coordinate measurements of said mobile unit.

3. An integrated laser and satellite positioning guidance system (LASATPSAG) comprising:

an integrated laser and satellite positioning system (LASATPS) positioned in a location with known coordinates, said LASATPS system comprising:

a laser system generating a rotating laser beam, said rotating laser beam providing a high accuracy reference laser plane; and a differential SATPS receiver integrated with said laser system, said differential SATPS receiver having a stationary antenna exposed to the view of sky, wherein the distance between the phase center of said stationary antenna and said reference laser plane is known and fixed;

a plurality of mobile units, each said mobile unit including a laser detector and a navigational device including a mobile satellite positioning system (SATPS) receiver; and a plurality of communication links between said LASATPS system and each said mobile unit, wherein at least one said communication link is used to transmit to each said mobile unit the elevation of said laser plane and differential corrections obtained by said differential SATPS receiver, and wherein for each said mobile unit one said navigational device utilizes positional data obtained by one said mobile SATPS receiver and said elevation data and said differential corrections data to obtain the precise coordinate measurements for said one mobile unit.

4. The system of claim 3;

wherein said differential SATPS receiver further comprises:

a differential GPS receiver;

and wherein said mobile SATPS receiver further comprises:

a mobile GPS receiver.

5. The system of claim 3, wherein at least one said communication link further comprises:

a radio link.

6. The system of claim 3, wherein at least one said communication link further comprises:

a modulation system adapted to modulate the laser beam with the elevation data and differential correction data.

7. The system of claim 6, wherein each said mobile unit further includes:

a computer, and wherein said computer utilizes the elevation data and the differential correction data received from said LASATPS system in order to precisely operate said mobile unit.

8. A method of guiding a plurality of mobile units utilizing an integrated laser and satellite positioning system LASATPSAG); said integrated laser and satellite positioning guidance system (LASATPSAG) comprising: (a) an integrated laser and satellite positioning system (LASATPS) positioned in a location with known coordinates, said LASATPS system further comprising a laser system generating a rotating laser beam, said rotating laser beam providing a high accuracy reference laser plane; and a differential SATPS receiver integrated with said laser system, said differential SATPS receiver having a stationary antenna exposed to the view of sky, wherein the distance between the phase center of said stationary antenna and said reference laser plane is known and fixed; (b) and at least one communication link between said LASATPS system and said mobile unit, wherein said at least one communication link is used to transmit to said one mobile unit the elevation of said laser plane and differential corrections obtained by said differential SATPS receiver, and wherein for said one mobile unit one said navigational device utilizes positional data obtained by said mobile SATPS receiver and said elevation data and said differential corrections data to obtain the precise coordinate measurements for said one mobile unit; said method comprising the steps of:

generating a laser beam having a reference laser plane with a high accuracy elevation by using said LASATPS system;

determining the elevation of said laser reference plane using a stationary SATPS receiver;

sequentially transmitting to each said mobile unit the elevation of said laser reference plane using a communication link between said LASATPS system and said mobile unit; and updating said elevation data with a rotational frequency.

9. A method of tracking a mobile unit utilizing an integrated laser and satellite positioning guidance system (LASATPSAG), said integrated laser and satellite positioning guidance system (LASATPSAG) comprising: (a) an integrated laser and satellite positioning system (LASATPS) positioned in a location with known coordinates, said LASATPS system further comprising a laser system generating a rotating laser beam, said rotating laser beam providing a high accuracy reference laser plane; and a differential SATPS receiver integrated with said laser system, said differential SATPS receiver having a stationary antenna exposed to the view of sky, wherein the distance between the phase center of said stationary antenna and said reference laser plane is known and fixed; (b) and at least one communication link between said LASATPS system and said mobile unit, wherein said at least one communication link is used to transmit to said one mobile unit the elevation of said laser plane and differential corrections obtained by said differential SATPS receiver, and wherein for said one mobile unit one said navigational device utilizes positional data obtained by said mobile SATPS receiver and said elevation data and said differential corrections data to obtain the precise coordinate measurements for said one mobile unit; said method comprising the steps of:

generating a laser beam having a high accuracy vertical coordinate by using said LASATPS system;

determining said vertical coordinate of said laser beam using a differential satellite positioning system (SATPS) receiver integrated with said laser system;

obtaining differential corrections data by said differential SATPS receiver;

tracking said mobile unit using said laser beam;

continuously transmitting to said mobile unit using said at least one communication link the vertical coordinate of said laser beam and said differential corrections data;

obtaining raw positional data of said mobile unit using a mobile SATPS receiver; and obtaining precise positional data of said mobile unit utilizing said raw positional data, said differential corrections data, and said laser beam precise vertical coordinate.

10. A method of guiding a plurality of mobile units utilizing an integrated laser and vector satellite positioning guidance system (LAVSATPSAG), said integrated laser and satellite positioning guidance system (LAVSATPSAG) comprising: (a) an integrated laser and vector satellite positioning system (LAVSATPS) positioned in a location with known coordinates, said LAVSATPS system further comprising: a laser system generating a rotating laser beam, said rotating laser beam providing a high accuracy dual slope reference laser plane; and a vector differential satellite positioning system (VSATPS) receiver integrated with said laser system, said vector differential VSATPS receiver having a master stationary satellite antenna and a plurality of slave stationary satellite antennas exposed to the view of sky, wherein said vector differential VSATPS receiver is capable of determining the attitude of said dual slope reference laser plane, and wherein the distance between a phase center of said master stationary satellite antenna and said reference laser plane is known and fixed; and at least one communication link between said LAVSATPS system and each said mobile unit; wherein at least one said communication link is used to transmit to one said mobile unit an elevation, a slope and angles of orientation of said laser plane at the location of said (LAVSATPS) and differential corrections obtained by said vector differential SATPS receiver; and wherein for each said mobile unit one said navigational device utilizes a set of data including a set of positional data obtained by one said mobile SATPS receiver, said elevation, said slope and said angles of orientation of said laser plane at the (LAVSATPS) location, and said differential corrections data in order to obtain the precise coordinate measurements of said mobile unit; said method comprising the steps of:

generating a rotating laser beam using said LAVSATPS system; said rotating laser beam providing a high accuracy dual slope reference laser plane;

determining an elevation, a slope and angles of orientation of said dual slope reference laser plane at the location of said laser system using a vector differential satellite positioning system (SATPS) receiver integrated with said laser system;

obtaining differential corrections data by said vector differential SATPS receiver;

transmitting to each said mobile unit said differential corrections data, said elevation, said slope and said angles of orientation of said laser plane at the location of said (LAVSATPS) using a communication link between said LAVSATPS system and said mobile unit;

obtaining raw positional data for each said mobile unit using a mobile SATPS receiver; and obtaining precise positional data for each said mobile unit using said raw positional data, said differential corrections data, and said elevation, said slope and said angles of orientation of said laser plane at the (LAVSATPS) location.

11. A method of guiding a plurality of mobile units utilizing an integrated laser and satellite positioning guidance system (LASATPSAG), said integrated laser and satellite positioning guidance system (LASATPSAG) comprising: (a) an integrated laser and satellite positioning system (LASATPS) positioned in a location with known coordinates, said LASATPS system further comprising a laser system generating a rotating laser beam, said rotating laser beam providing a high accuracy reference laser plane; and a differential SATPS receiver integrated with said laser system, said differential SATPS receiver having a stationary antenna exposed to the view of sky, wherein the distance between the phase center of said stationary antenna and said reference laser plane is known and fixed; (b) and at least one communication link between said LASATPS system and said mobile unit, wherein said at least one communication link is used to transmit to said one mobile unit the elevation of said laser plane and differential corrections obtained by said differential SATPS receiver, and wherein for said one mobile unit one said navigational device utilizes positional data obtained by said mobile SATPS receiver and said elevation data and said differential corrections data to obtain the precise coordinate measurements for said one mobile unit; said method comprising the steps of:

generating a rotating laser beam by using said LASATPS system; said rotating laser beam providing a high accuracy reference laser plane;

determining an elevation of said reference laser plane at the location of said laser system using a differential satellite positioning system (SATPS) receiver integrated with said laser system;

obtaining differential corrections data by said differential SATPS receiver;

transmitting to each said mobile unit said differential corrections data and said elevation data using a communication link between said LASATPS system and said mobile unit;

obtaining raw positional data for each said mobile unit using a mobile SATPS receiver;

obtaining precise positional data for each said mobile unit using said raw positional data, said differential corrections data, and said elevation data using a navigational computer; and utilizing the generated precise positional data to precisely operate said mobile unit using said navigational computer.

* * * * *